(12) United States Patent
Lee et al.

(10) Patent No.: US 8,743,859 B2
(45) Date of Patent: Jun. 3, 2014

(54) APPARATUSES, SYSTEMS, AND METHODS FOR MANAGING OPERATION STATUS OF WIRELESS TRANSMISSIONS AND RECEPTIONS

(75) Inventors: Anthony Lee, San Diego, CA (US); Guotong Wang, Beijing (CN); Jian Gu, Beijing (CN)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 546 days.

(21) Appl. No.: 12/851,764

(22) Filed: Aug. 6, 2010

(65) Prior Publication Data

US 2011/0032924 A1 Feb. 10, 2011

Related U.S. Application Data

(60) Provisional application No. 61/231,682, filed on Aug. 6, 2009, provisional application No. 61/293,188, filed on Jan. 7, 2010.

(51) Int. Cl.
*H04J 3/00* (2006.01)

(52) U.S. Cl.
USPC .......................... 370/345; 450/422.1; 450/425

(58) Field of Classification Search
USPC ........................................ 370/345; 455/422.1
See application file for complete search history.

(56) References Cited

U.S. PATENT DOCUMENTS

| 2009/0239545 A1* | 9/2009 | Lee et al. ...................... 455/450 |
| 2011/0009116 A1* | 1/2011 | Moberg et al. ................. 455/425 |
| 2011/0294491 A1* | 12/2011 | Fong et al. .................. 455/422.1 |

FOREIGN PATENT DOCUMENTS

CN 101483925 7/2009

OTHER PUBLICATIONS

English language translation of abstract of CN 101483925 (published Jul. 15, 2009).

\* cited by examiner

*Primary Examiner* — Wanda Z Russell
(74) *Attorney, Agent, or Firm* — McClure, Qualey & Rodack, LLP (57) ABSTRACT

A mobile communication device for managing the operation status of wireless transmissions and receptions is provided. In the mobile communication device, a wireless module performs the wireless transmissions and receptions. Also, in the mobile communication device, a controller module activates the wireless module to transmit a scheduling request message to the service network, and keeps the wireless module activated for the wireless receptions in a first predetermined period of time subsequent to the transmission of the scheduling request message.

17 Claims, 7 Drawing Sheets

APPARATUSES, SYSTEMS, AND METHODS FOR MANAGING OPERATION STATUS OF WIRELESS TRANSMISSIONS AND RECEPTIONS

CROSS REFERENCE TO RELATED APPLICATIONS

This Application claims the benefit of U.S. Provisional Application No. 61/231,682, filed on Aug. 6, 2009, the entirety of which is incorporated by reference herein, and this Application also claims the benefit of U.S. Provisional Applications No. 61/293,188, filed on Jan. 7, 2010, the entirety of which is incorporated by reference herein.

BACKGROUND OF THE INVENTION

1. Field of the Invention

The invention generally relates to transmission and reception controls in mobile communication systems, and more particularly, to managing the operation status of wireless transmissions and receptions for the mobile terminals.

2. Description of the Related Art

For a mobile communication system, the communications between a user and the equipment (referred to as UE herein) and a service network are performed arbitrarily according to the requests from or to the user of the user equipment. Since the UE does not necessarily operate in a transmission mode or reception mode for data transmissions and receptions at all times, always keeping the UE in a transmission mode or reception mode may be unnecessary and, not to mention, is very power consuming. In order to reduce the overheads in the consumed power, the UE may employ a discontinuous reception (DRX) technique when there is no potential transmission and reception in a certain period of time. During a DRX cycle, the UE may perform wireless transmissions or receptions in a DRX-ON duration, and make the wireless module and/or other function components enter a sleep mode in a DRX-OFF duration. Specifically, when the wireless module and/or other function components in the UE are operating in sleep mode, the power consumed by the processor therein is mainly for keeping a low-rate clock for timing synchronization with the connected service network.

Figure 1:
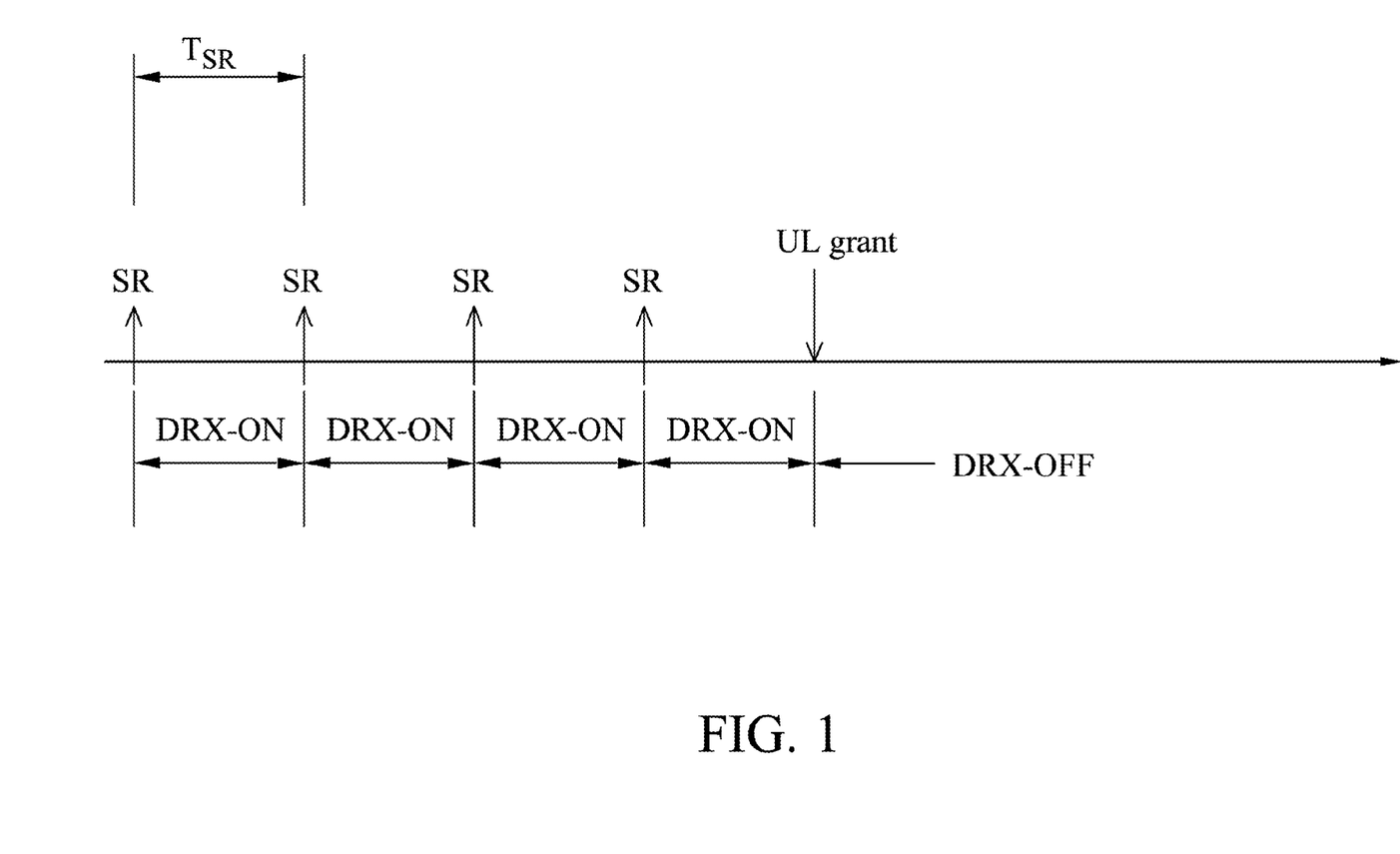
FIG. 1 is a schematic diagram illustrating the conventional operation status of a UE.
Figure 2:
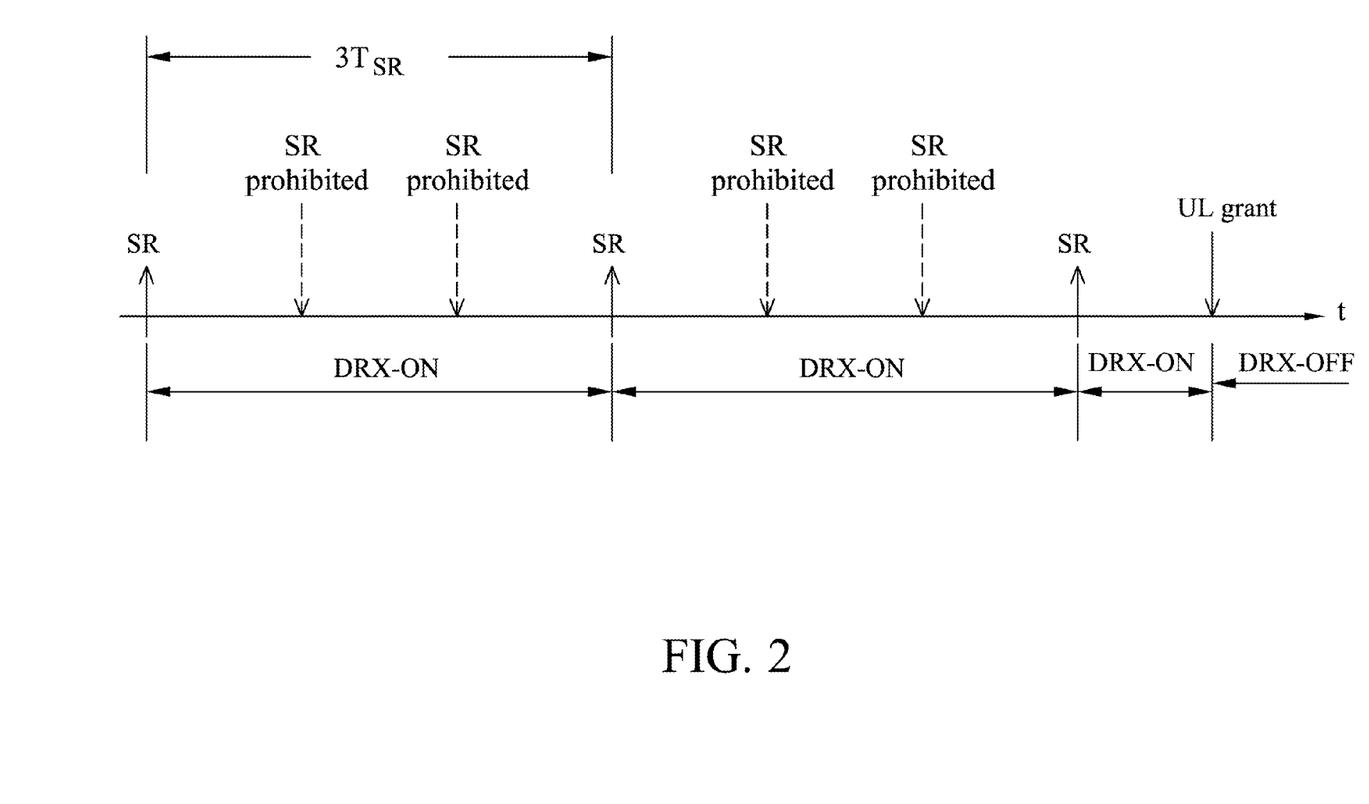
FIG. 2 is a schematic diagram illustrating the conventional operation status of a UE employing DRX technique and SR prohibition control.

However, the potential transmission and reception may involve unnecessary monitoring on the downlink channel, which results in prolonging the DRX-ON duration to an extent where the UE always remains operative even if there is no data transmission or reception. Take a Long Term Evolution (LTE) system for example. As shown in FIG. 1, when a UE configured with a DRX cycle wishes to perform wireless transmission, it conventionally wakes up from sleep mode to transmit a scheduling request (referred to as SR herein) message to the connected service network and monitor the downlink channel for a response message. If there is no response message received in a waiting period $T_{SR}$, the UE retransmits the SR message and monitors the downlink channel for a response message again, until a response message (denoted as UL grant message) is received from the connected service network. Note that the intervals between the transmissions of the SR message are all DRX-ON durations in which the UE remains operative for all time before a response message is received, even if the UE employs the DRX technique. FIG. 2 is a schematic diagram illustrating the conventional operation status of a UE employing DRX technique and SR prohibition control. Similar to FIG. 1, when a UE configured with a DRX cycle wishes to perform wireless transmission, it wakes up from the sleep mode to transmit an SR message to the connected service network and monitor the downlink channel for a response message. However, with the SR prohibition control employed, the retransmission of the SR message is prohibited for a predetermined number of times to avoid unnecessary SR transmissions on the uplink channel, especially for voice-over-IP (VoIP) traffic. As shown in FIG. 2, the predetermined number of prohibited SR retransmissions is set to 2. That is, the retransmission of the SR message is performed if no response message is received from the connected service network in 3 times of the waiting periods $T_{SR}$ (i.e. plus 2 additional waiting periods for the prohibited SR retransmissions). Note that even if the SR prohibition control is employed, the UE still has to remain operative during the waiting periods for the prohibited SR retransmissions. Thus, the DRX-ON duration is unnecessarily prolonged in the conventional design, which contradicts to the intention of the DRX technique and causes significant overheads in power consumption.

BRIEF SUMMARY OF THE INVENTION

Accordingly, embodiments of the invention provide apparatuses, systems, and methods for managing the operation status of wireless transmissions and receptions. In one aspect of the invention, a mobile communication device for managing operation status of wireless transmissions and receptions with a service network is provided. The mobile communication device comprises a wireless module and a controller module. The wireless module performs the wireless transmissions and receptions. The controller module activates the wireless module to transmit a scheduling request message to the service network, and keeps the wireless module activated for the wireless receptions in a first predetermined period of time subsequent to the transmission of the scheduling request message.

In another aspect of the invention, a method for managing the operation status of wireless transmissions and receptions with a service network in a mobile communication device is provided. The method comprises the steps of activating the wireless transmissions and receptions for transmitting a scheduling request message to the service network, and keeping the wireless receptions activated in a first predetermined period of time subsequent to the transmission of the scheduling request message.

In another aspect of the invention, a mobile communication system is provided. The mobile communication system comprises a service network and a mobile communication device. The service network receives a scheduling request message from the mobile communication device. The mobile communication device activates wireless transmissions and receptions with the service network for transmitting the scheduling request message, and keeps the wireless transmissions and receptions activated in a first predetermined period of time subsequent to the transmission of the scheduling request message.

Other aspects and features of the invention will become apparent to those with ordinary skill in the art upon review of the following descriptions of specific embodiments of the mobile communication device, the method for managing operation status of wireless transmissions and receptions and improving signaling of wireless transmission resumption in a mobile communication device, and the mobile communication system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
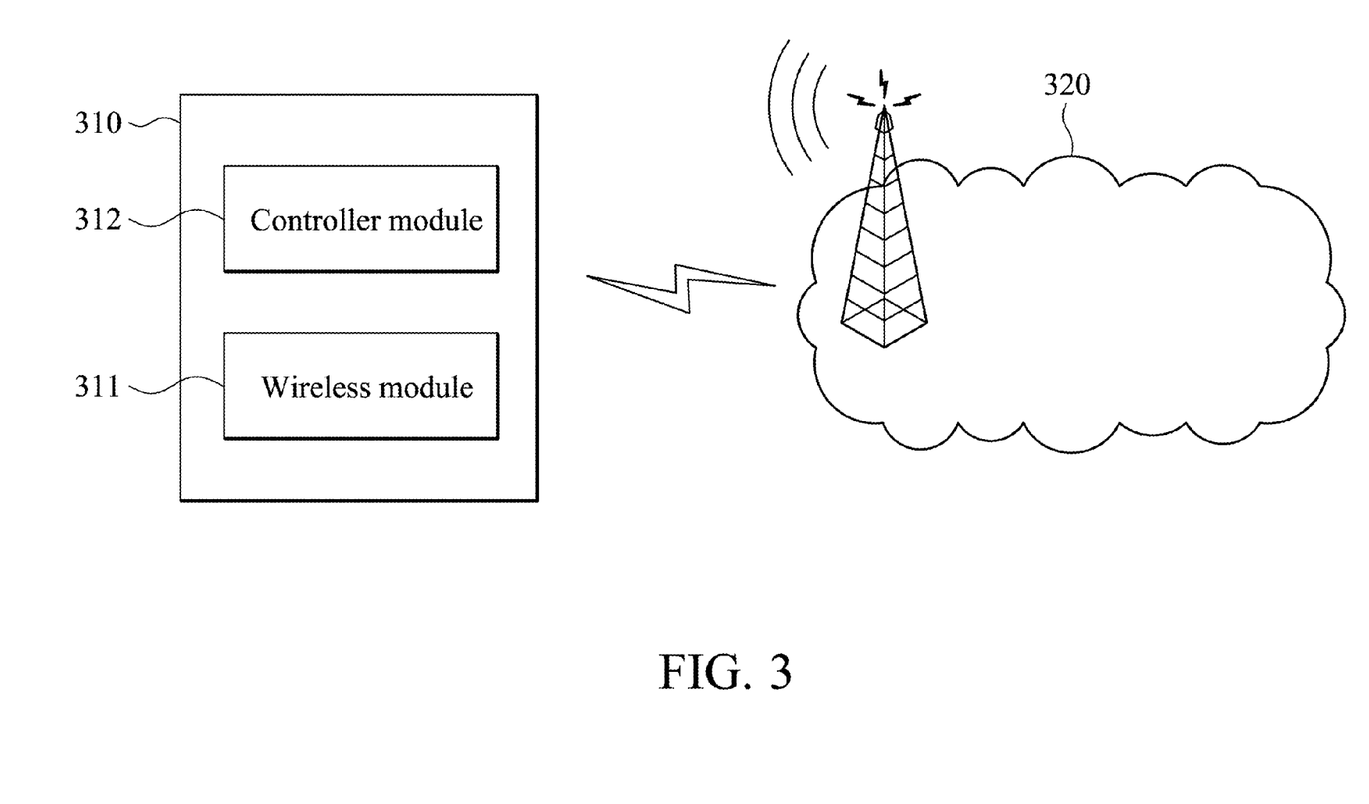
FIG. 3 is a block diagram illustrating the mobile communication system according to an embodiment of the invention.

In order to eliminate the unnecessary prolonged problem regarding the DRX-ON duration, the invention provides an improved method for managing the operation status of the wireless transmissions and receptions in a mobile communication device. FIG. 3 is a block diagram illustrating the mobile communication system according to an embodiment of the invention. In the mobile communication system 300, the mobile communication device 310 is wirelessly connected to the service network 320 for transmitting or receiving data there-between via an air interface. The mobile communication device 310 comprises a wireless module 311 for performing the functionality of wireless transmissions and receptions. The wireless module 311 may further comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1800 MHz or 1900 MHz utilized in GSM systems, or may be 900 MHz, 1900 MHz or 2100 MHz utilized in WCDMA systems, or others depending on the radio access technology (RAT) in use. Also, the mobile communication device 310 comprises a controller module 312 for controlling the operation status of the wireless module 311 and other function components, such as a display unit and/or keypad serving as the MMI (man-machine interface), a storage unit storing the program codes of applications or communication protocols, or others.

Figure 4:
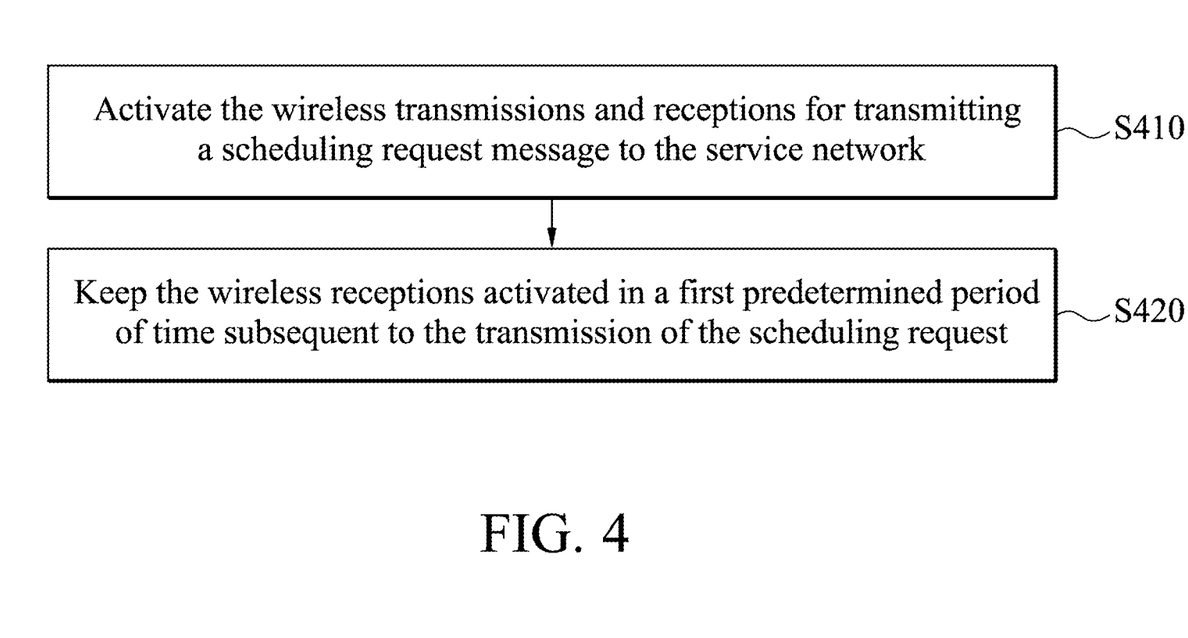
FIG. 4 is a flow chart illustrating the method for managing the operation status of wireless transmissions and receptions in the mobile communication device 310 according to an embodiment of the invention.

To be more specific, the controller module 312 controls the operation status of the wireless module 311 especially when the mobile communication device 310 is configured with a DRX cycle and the SR prohibition control is employed, wherein the DRX cycle is determined from the DRX configuration information included in a configuration message received from the service network 320. The configuration message may be an RRC CONNECTION RECONFIGURATION message, RRC CONNECTION SETUP message, or RRC CONNECTION REESTABLISHMENT message in an LTE system. FIG. 4 is a flow chart illustrating the method for managing the operation status of wireless transmissions and receptions in the mobile communication device 310 according to an embodiment of the invention. When the mobile communication device 310 needs to initiate an uplink data transmission, it activates the functionality of wireless transmission and reception for transmitting an SR message to the service network 320 (step S410). Subsequently, in order to receive a response message corresponding to the SR message from the service network 320, the mobile communication device 310 keeps the functionality of wireless reception activated in a predetermined period of time subsequent to the transmission of the SR message (step S420). Later, if no response message corresponding to the SR message is received from the service network 320 in the predetermined period of time, the mobile communication device 310 deactivates the functionality of wireless transmission and reception, to reduce power consumption. It is noted that before initiating the uplink data transmission, the mobile communication device 310 may receive a configuration message from the service network 320, wherein the configuration message comprises the DRX information for configuring the DRX cycle. Also, the mobile communication device 310 may deactivate the functionality of wireless transmission and reception in response to the configuration message comprising the DRX information, until the uplink data transmission is initiated.

Figure 5:
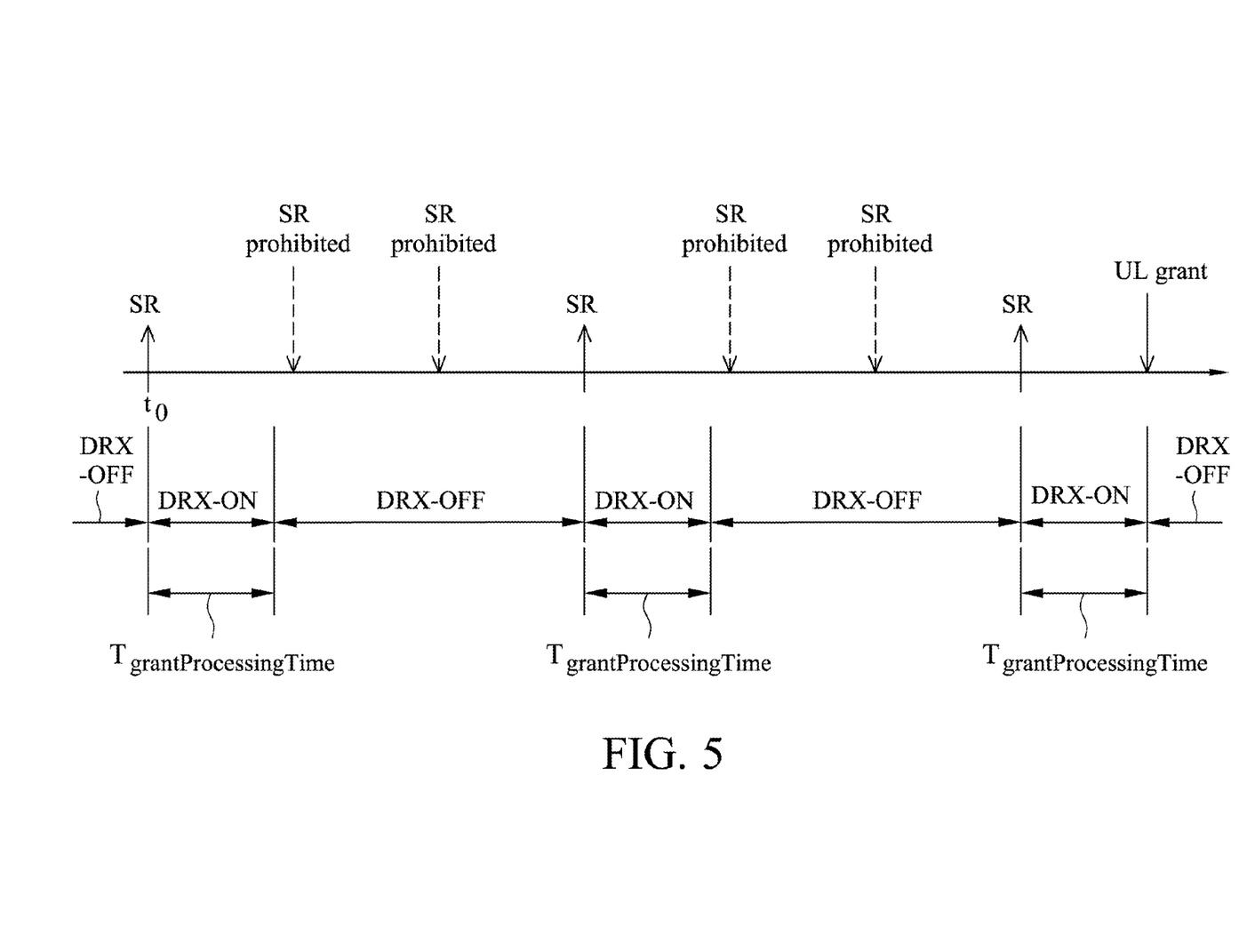
FIG. 5 is a timing chart illustrating the DRX operation status of the mobile communication device 310 configured with SR prohibition control according to an embodiment of the invention.

FIG. 5 is a timing chart illustrating the DRX operation status of the mobile communication device 310 configured with SR prohibition control according to an embodiment of the invention. In this embodiment, the mobile communication device 310 and the service network 320 are in compliance with the communication protocol of the LTE technology. Initially, the controller module 312 deactivates the wireless module 311 from the wireless transmissions and receptions in response to the configuration message comprising the DRX information as described above, so the mobile communication device 310 is in a DRX-OFF duration before time $t_0$. At time $t_0$, the controller module 312 receives an uplink data transmission request, and accordingly, the controller module 312 activates the wireless module 311 to transmit an SR message to the service network 320, and keeps the wireless module 311 activated for monitoring the physical downlink control channel (PDCCH) in a period $T_{grantProcessingTime}$ subsequent to the transmission of the SR message. During the period $T_{grantProcessingTime}$, the mobile communication device 310 is in a DRX-ON duration. That is, the wireless module 311 only has to remain activated for monitoring a possible response message corresponding to the transmitted SR message from the service network 320. The period $T_{grantProcessingTime}$ indicates the estimated period of time between the transmission time of the SR message and the reception time of the response message, assuming that the service network 320 has received the SR message and accordingly replies with the response message. If no response message corresponding to the SR message is received from the service network 320 in the period $T_{grantProcessingTime}$, the controller module 312 deactivates the wireless module 311 from the wireless transmissions and receptions. Note that the mobile communication device 310 is also configured with SR prohibition control, and the prohibited number of SR retransmissions is set to 2. According to the configuration of the SR prohibition control, the SR retransmissions are prohibited at time ($t_0+T_{SR}$) and ($t_0+2T_{SR}$), and meanwhile, the wireless module 311 remains deactivated until the third SR retransmission is initiated at time ($t_0+3T_{SR}$). In one embodiment, the controller module 312 may maintain a counter to keep track of the prohibited number of SR retransmissions. It is to be understood that the prohibited number of SR retransmissions may be set to any number other than 2. For example, the prohibited number of SR retransmissions may be preferably set to a number between 0 and 7 in an LTE system.

Subsequently, the controller module 312 activates the wireless module 311 to retransmit the SR message at time ($t_0+3T_{SR}$). Again, during the period $T_{grantProcessingTime}$ starting from time ($t_0+3T_{SR}$), the mobile communication device 310 is in a DRX-ON duration. Similarly, due to not receiving a response message corresponding to the retransmitted SR message from the service network 320 in the period $T_{grantProcessingTime}$, the controller module 312 deactivates the wireless module 311 from the wireless transmissions and receptions again. After 2 prohibited SR retransmissions, the controller module 312 activates the wireless module 311 to retransmit the SR message at time ($t_0+6T_{SR}$). Latter at time ($t_0+6T_{SR}+T_{grantProcessingTime}$), the controller module 312 deactivates the wireless module 311 from the wireless transmissions and receptions in response to receiving a response message from the service network 320, and the SR retransmission procedure ends. In one embodiment, the period $t_{grantProcessingTime}$ may be a parameter given by the service network 320 in the configuration message, and the parameter may be configurable according to the loading of the service network 320 and/or the link quality between the mobile communication device 310 and the service network 320. For example, if the link quality between the mobile communication device 310 and the service network 320 is good and the loading of the service network 320 is light, the period $T_{grantProcessingTime}$ may be set to a relatively small value in which the service network 320 may smoothly transmit the response message upon receiving the SR message and the response message may be received by the mobile communication device 310 at higher rate; otherwise, if the link quality between the mobile communication device 310 and the service network 320 is bad and/or the loading of the service network 320 is heavy, the period $T_{grantProcessingTime}$ may be set to a relatively large value in which the service network 320 may delay the transmission of the response message upon receiving the SR message and/or the response message may be received by the mobile communication device 310 at lower rate. In one embodiment, the controller module 312 may maintain 2 separate timers with the value of the period $T_{grantProcessingTime}$ and $T_{SR}$, respectively, and the timers may be designed to count down from the assigned value when started, and issue a notification to the controller module 312 when expires.

Figure 6A:
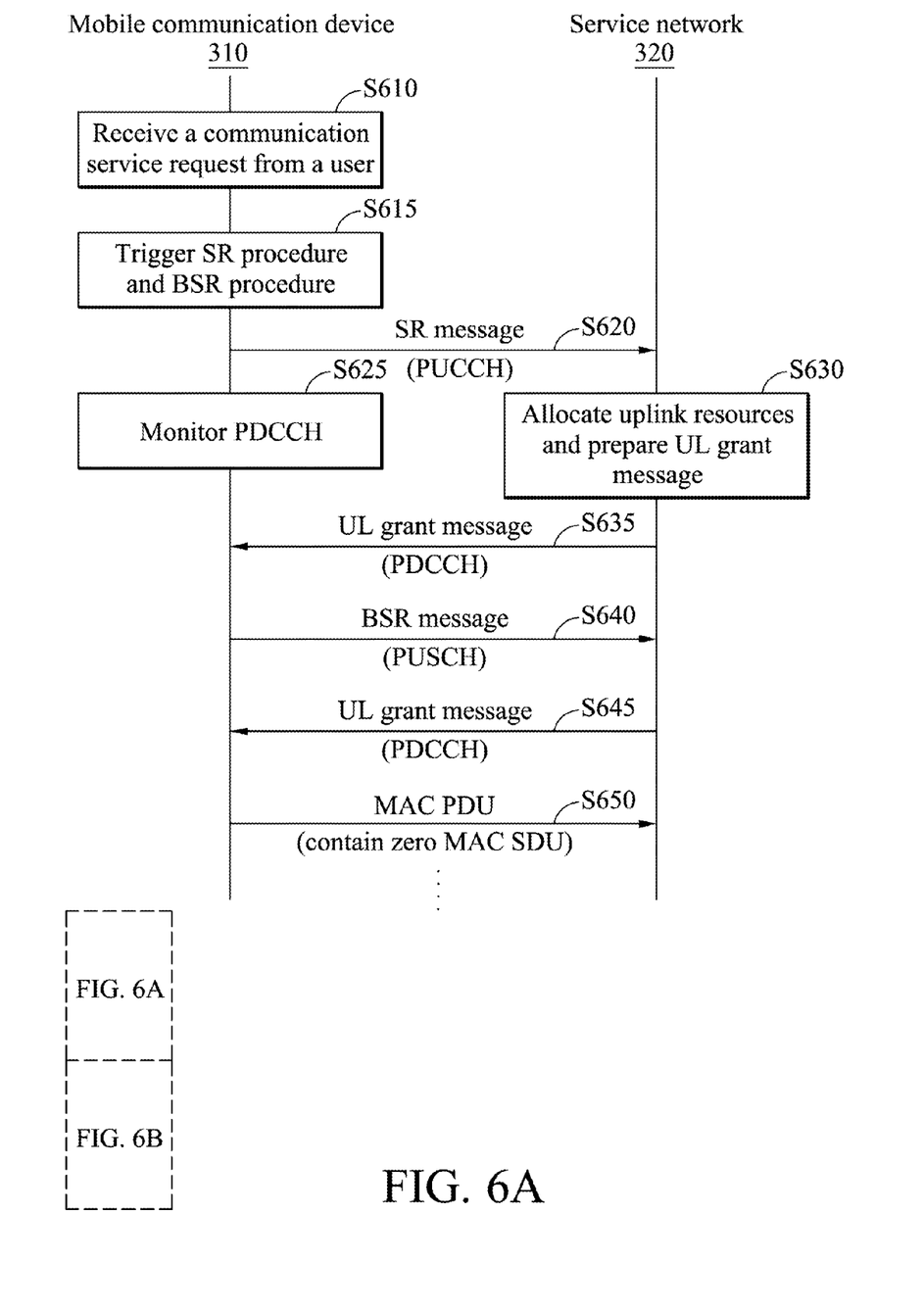
FIGS. 6A and B are message sequence charts of the signaling of wireless transmission resumption according to an embodiment of the invention.
Figure 6B:
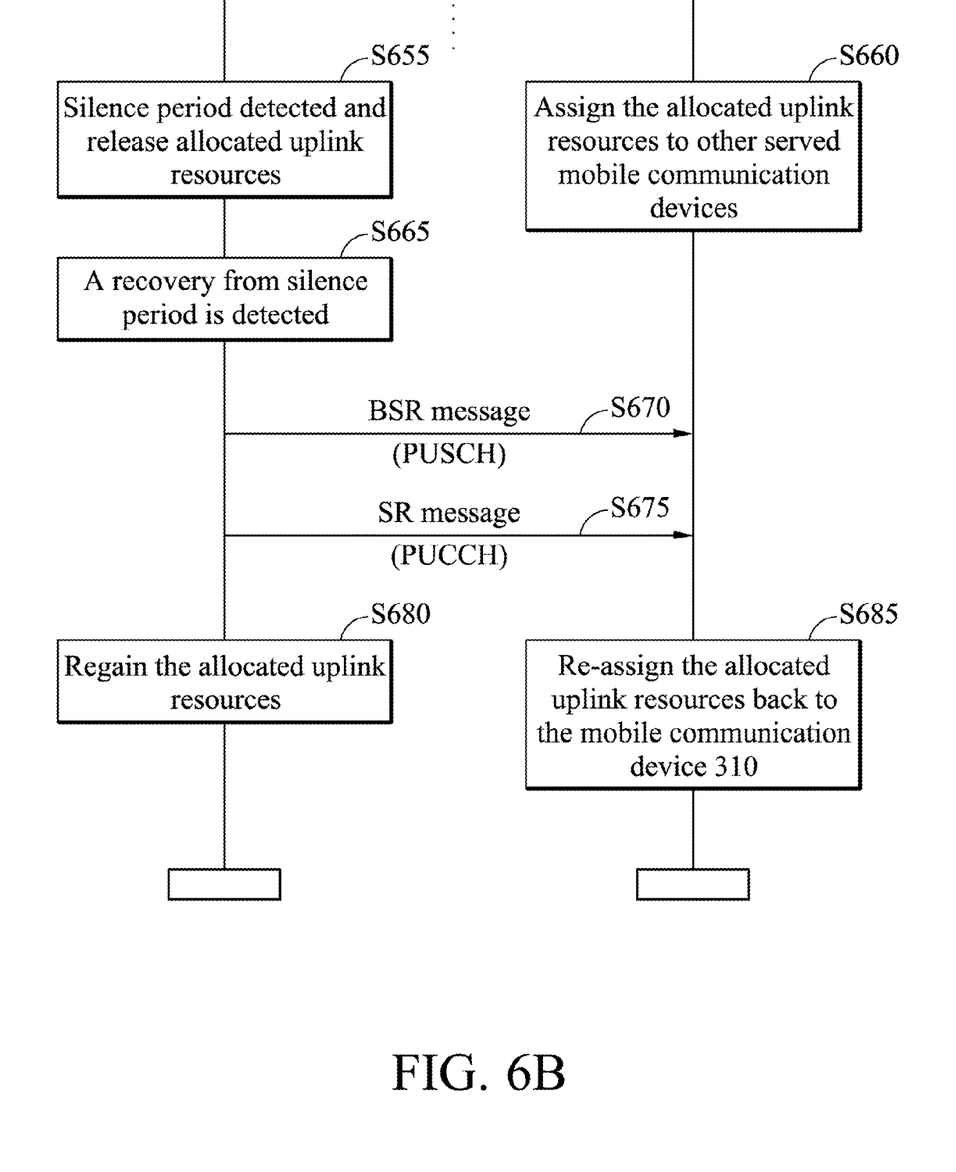

In addition to managing the operation status of wireless transmissions and receptions in DRX mode, the invention also provides a method for improving the signaling of wireless transmission resumption in a mobile communication device. FIG. 6A is a message sequence chart of the signaling of wireless transmission resumption according to an embodiment of the invention. In this embodiment, the mobile communication device 310 and the service network 320 are in compliance with the communication protocol of the LTE technology. When receiving a communication service request from a user (step S610), the mobile communication device 310 may trigger an SR procedure and a buffer status report (BSR) procedure to negotiate uplink resources with the service network 320 (step S615). In response to the triggers, the mobile communication device 310 transmits an SR message to the service network 320 over physical uplink control channel (PUCCH) (step S620), and then monitors PDCCH for any incoming message (step S625). When receiving the SR message, the service network 320 allocates uplink resources according to the SR message and prepares an UL grant message with information of the allocated uplink resources (step S630). Subsequently, the service network 320 transmits the UL grant message to the mobile communication device 310 over PDCCH (step S635). When receiving the UL grant message, the mobile communication device 310 then transmits a BSR message to the service network 320 over PUSCH (step S640). The BSR message is related with the uplink resource and the configuration thereof in one embodiment. Later, the mobile communication device 310 receives another UL grant message from the service network 320 over PDCCH (step S645), and the resource negotiation procedure ends. In this embodiment, the communication service is for a delay-sensitive application, such as the VoIP, so through the above communications between the mobile communication device 310 and the service network 320, the communication service is configured to operate in a semi-persistent scheduling mode where the allocated uplink resources is scheduled in a repetitive basis so that the control signaling is only required at the first transmission. Note that during a voice call, there may be silence periods where the user of the mobile communication device 310 does not talk at all. In response to the silent period, the mobile communication device 310 transmits a predetermined number of consecutive zero-content data packets (e.g. MAC PDUs each containing zero MAC SDUs) to the service network 320 (step S650). When detecting the predetermined number of consecutive zero-content data packets are transmitted, the mobile communication device 310 releases the allocated uplink resources (step S655)(FIG. 6B). Meanwhile, upon receiving the predetermined number of consecutive zero-content data packets, the service network 320 also detects the occurrence of a silence period and accordingly assigns the allocated uplink resources to other served mobile communication devices (step S660). In one embodiment, the predetermined number of consecutive zero-content data packets is a parameter given by the service network 320 to the mobile communication device 310; while in other embodiments, the predetermined number of consecutive zero-content data packets may be negotiated by the service network 320 and the mobile communication device 310, or alternatively, may be a configurable parameter determined by the communication service.

Next, when a recovery from silence period is detected (step S665), the mobile communication device 310 transmits a BSR message to the service network 320 to report its buffer status (step S670), and then transmits an SR message to inform the service network 320 about the recovery from silence period (step S675). Right after the transmissions of the BSR message and SR message, the mobile communication device 310 considers the UL grant validated and thus, regains the allocated uplink resources for transmitting new voice data (step S680). Upon receiving the SR message from the mobile communication device 310, the service network 320 knows that a recovery from silence period occurs for the communication service, and re-assigns the allocated uplink resources back to the mobile communication device 310 (step S685). Therefore, the allocated uplink resources of the mobile communication device 310 may be reused by other mobile communication devices when the ongoing communication service is in silence period, and smoothly regained by the mobile communication device 310 when the communication service recovers from silence period. Regarding the re-usage of the allocated uplink resources, it is noted that the service network 320 may assign the allocated uplink resources frame by frame to other served mobile communication devices, to avoid the allocated uplink resources being occupied for a long period of time which may cause unbearable delay to the recovery from silence period for the communication service. In one embodiment, the allocated uplink resources may not be assigned multiple frames at a time to one other served mobile communication device, nor be assigned to other served mobile communication devices operating in the semi-persistent scheduling mode.

While the invention has been described by way of example and in terms of preferred embodiment, it is to be understood that the invention is not limited thereto. Those who are skilled in this technology can still make various alterations and modifications without departing from the scope and spirit of this invention. For example, the mobile communication device 310 and the service network 320 may be in compliance with the communication protocols of the LTE, WiMAX, WiFi, HRPD, and/or EV-DO technology. Therefore, the scope of the invention shall be defined and protected by the following claims and their equivalents.

What is claimed is:

1. A mobile communication device for managing Discontinuous Reception (DRX) operation with a service network, comprising:
    a wireless module performing wireless transmissions and receptions; and
    a controller module activating the wireless module to transmit a scheduling request message to the service network, keeping the wireless module activated for the wireless receptions in a first predetermined period of time subsequent to the transmission of the scheduling request message, and deactivating the wireless module from the wireless transmissions and receptions in response to that no response message corresponding to the scheduling request message is received from the service network in the first predetermined period of time, without prolonging a DRX-ON duration of the DRX cycle with Scheduling Request (SR) prohibition control for periodic retransmission of the scheduling request message.

2. The mobile communication device of claim 1, wherein the controller module further prohibits retransmission of the scheduling request message performed in response to not receiving the response message in the first predetermined period of time, for the SR prohibition control, and the wireless module remains deactivated for the prohibited retransmissions of the scheduling request message.

3. The mobile communication device of claim 1, wherein the wireless module further receives at least one configuration message from the service network, the controller module further keeps the wireless module deactivated before transmitting the scheduling request message in response to the configuration message comprising discontinuous reception information, and the configuration message is selected from at least one of the following:
    RRC CONNECTION RECONFIGURATION;
    RRC CONNECTION SETUP; and
    RRC CONNECTION REESTABLISHMENT.

4. The mobile communication device of claim 1, wherein the wireless module further receives a response message, corresponding to the scheduling request message, comprising information concerning an uplink resource assigned by the service network, and the controller module further configures the wireless module to transmit data of a communication service to the service network using the uplink resource, configures the wireless module to release the uplink resource after transmitting a predetermined number of consecutive zero-content data packets to the service network, and configures the wireless module to regain the uplink resource by transmitting another scheduling request message to the service network, so that the wireless module uses the uplink resource to resume transmitting the data of the communication service right after transmitting the another scheduling request message, without waiting to receive a response corresponding to the another scheduling request message from the service network.

5. The mobile communication device of claim 4, wherein the service network assigns the uplink resource to other served mobile communication devices in response to receiving the consecutive zero-content data packets, and re-assigns the uplink resource back to the mobile communication device, without replying to the mobile communication device with a response message, in response to the another scheduling request message.

6. The mobile communication device of claim 4, wherein the communication service is operating in a semi-persistent scheduling mode.

7. A method for managing Discontinuous Reception (DRX) operation with a service network in a mobile communication device, comprising:
    activating wireless transmissions and receptions for transmitting a scheduling request message to the service network;
    keeping the wireless receptions activated in a first predetermined period of time subsequent to the transmission of the scheduling request message; and
    deactivating the wireless transmissions and receptions in response to that no response message corresponding to the scheduling request message is received from the service network in the first predetermined period of time, without prolonging a DRX-ON duration of the DRX cycle with Scheduling Request (SR) prohibition control for periodic retransmission of the scheduling request message.

8. The method of claim 7, further comprising prohibiting retransmission of the scheduling request message performed in response to not receiving the response message in the first predetermined period of time, for the SR prohibition control, wherein the wireless transmissions and receptions remain deactivated for the prohibited retransmission of the scheduling request message.

9. The method of claim 7, further comprising receiving a configuration message from a service network, and keeping the wireless transmissions and receptions deactivated before transmitting the scheduling request message in response to the configuration message comprising discontinuous reception information, wherein the configuration message is selected from at least one of the following:
    RRC CONNECTION RECONFIGURATION;
    RRC CONNECTION SETUP; and
    RRC CONNECTION REESTABLISHMENT.

10. The method of claim 7, further comprising:
    receiving a response message, corresponding to the scheduling request message, comprising information concerning an uplink resource assigned by the service network;
    transmitting data of a communication service to the service network using the uplink resource;

releasing the uplink resource after transmitting a predetermined number of consecutive zero-content data packets to the service network; and regaining the uplink resource for resuming transmitting the data of the communication service right after transmitting another scheduling request message to the service network, without waiting to receive a response corresponding to the another scheduling request message from the service network.

11. The method of claim 10, wherein the service network assigns the uplink resource to other served mobile communication devices in response to receiving the consecutive zero-content data packets, and re-assigns the uplink resource back to the mobile communication device, without replying to the mobile communication device with a response message, in response to the another scheduling request message.

12. The method of claim 10, wherein the communication service is operating in a semi-persistent scheduling mode.

13. A mobile communication system for managing Discontinuous Reception (DRX) operation, comprising:

a service network receiving a scheduling request message; and a mobile communication device activating wireless transmissions and receptions with the service network for transmitting the scheduling request message, keeping the wireless transmissions and receptions activated in a first predetermined period of time subsequent to the transmission of the scheduling request message, and deactivating the wireless transmissions and receptions in response to that no response message corresponding to the scheduling request message is received from the service network in the first predetermined period of time, without prolonging a DRX-ON duration of the DRX cycle with Scheduling Request (SR) prohibition control for periodic retransmission of the scheduling request message.

14. The mobile communication system of claim 13, wherein the mobile communication device, for the SR prohibition control, further prohibits retransmission of the scheduling request message performed in response to not receiving the response message in the first predetermined period of time, and remains deactivated from the wireless transmissions and receptions for the prohibited retransmission of the scheduling request message.

15. The mobile communication system of claim 13, wherein the mobile communication device further receives a configuration message from the service network, and keeps the wireless transmissions and receptions deactivated before transmitting the scheduling request message in response to the configuration message comprising discontinuous reception information, and the configuration message is selected from at least one of the following:

RRC CONNECTION RECONFIGURATION;
RRC CONNECTION SETUP; and
RRC CONNECTION REESTABLISHMENT.

16. The mobile communication system of claim 13, wherein the mobile communication device further receives a response message, corresponding to the scheduling request message, comprising information concerning an uplink resource assigned by the service network, transmits data of a communication service to the service network using the uplink resource, releases the uplink resource after transmitting a predetermined number of consecutive zero-content data packets to the service network, regains the uplink resource for resuming transmitting the data of the communication service right after transmitting another scheduling request message to the service network, without waiting to receive a response corresponding to the another scheduling request message from the service network.

17. The mobile communication system of claim 16, wherein the service network further assigns the uplink resource to other served mobile communication devices in response to receiving the consecutive zero-content data packets, and re-assigns the uplink resource back to the mobile communication device, without replying to the mobile communication device with a response message, in response to the another scheduling request message.

* * * * *